W. F. BEHLING.
SPARE TIRE CARRIER.
APPLICATION FILED MAR. 5, 1921.

1,410,448. Patented Mar. 21, 1922.

Witnesses
Wm. Schnellhardt.
J. D. Stuwe

Inventor
William F. Behling
By Joshua R H Potts
His Attorney

UNITED STATES PATENT OFFICE.

WILLIAM F. BEHLING, OF ELGIN, ILLINOIS.

SPARE-TIRE CARRIER.

1,410,448.    Specification of Letters Patent.    Patented Mar. 21, 1922.

Application filed March 5, 1921. Serial No. 449,858.

*To all whom it may concern:*

Be it known that I, WILLIAM F. BEHLING, a citizen of the United States, and a resident of the city of Elgin, county of Kane, and State of Illinois, have invented certain new and useful Improvements in Spare-Tire Carriers, of which the following is a specification.

My invention relates to improvements in spare tire carriers, and has for its object the provision of means which will carry a plurality of spare tires and will carry them in an extra safe manner.

Other objects will appear hereinafter.

The invention consists in the combinations and arrangements of parts hereinafter described and claimed.

The invention will be best understood by reference to the accompanying drawing forming a part of this specification, and in which, Fig. 1 is a fragmentary rear view of a motor vehicle, showing my tire carrier in position thereon.

Figure 2:
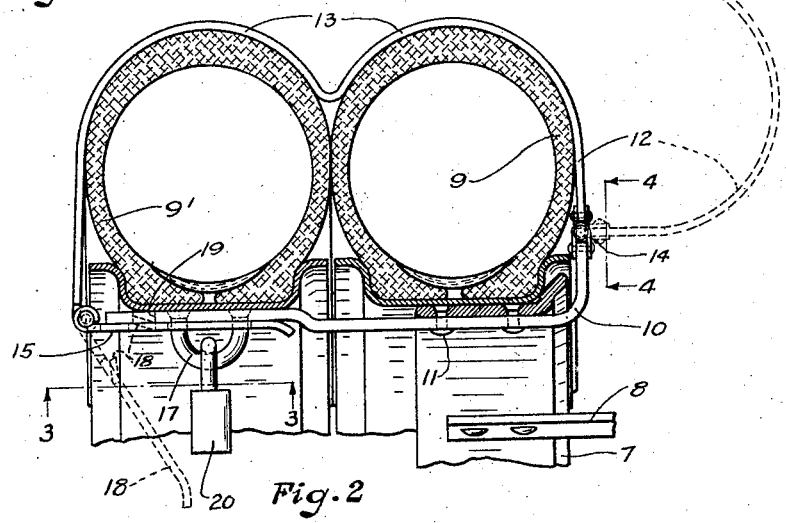
Fig. 2 is a sectional view on line 2—2 of Fig. 1.

In the drawing a portion of an automobile 6 is shown, upon the rear of which an ordinary tire carrier ring 7 is mounted, by means of brackets 8, attached to the automobile body, or in any suitable manner. A spare tire 9 is mounted on said ring, as best seen in Fig. 2. To the inner side of said carrier ring I fasten the base member 10 of my extra spare tire carrier, by means of rivets 11, or the like. One end of a strap 12, formed with two curved portions 13, is connected to said base member by a hinge 14, while the other end of said strap is hingedly connected with a clasp 15, which is provided with a slot 16, adapted to engage over a loop 17 extending from the base member 10, adjacent the free end of said member. A finger 18 is struck up from said clasp 15 and engages firmly in a notch 19, provided in the base member 10 adjacent the loop 17. This finger and notch are capable of holding the clasp firmly seated on the base member. A pad lock 20 is snapped in the loop, over the latch, to lock the carrier upon the spare tires clasped therein.

Figure 1:
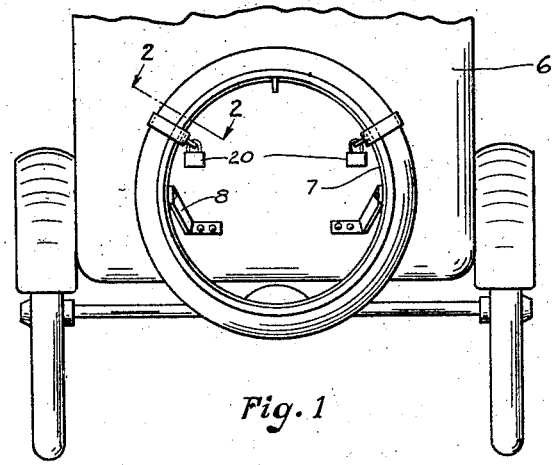
Figure 3:
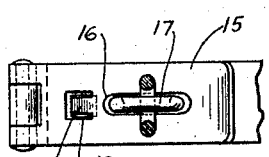
Fig. 3 is a detail view taken on line 3—3 of Fig. 2, showing the engaging and locking elements.
Figure 4:
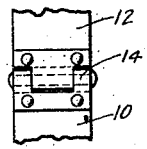
Fig. 4 is a detail view of the hinge connection, taken on line 4—4 of Fig. 2.

In use my carrier is fastened on the customary spare tire ring, as shown in the drawing, and the strap folded open, as shown in the dotted lines in Fig. 2, whereupon either the one spare tire 9 may be placed on the ring as usual, or an extra spare tire 9' may be added, which will be supported upon the tire carriers, two of such carriers being used as shown in Fig. 1. By closing the clasp 15 on the loop 17 the finger 18 will be snapped in the notch 19 and hold the clasp in position on the base member, and by using the pad lock 20 the tires will be securely locked within the carrier.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:—

1. A spare tire carrier comprising a base member mounted on an automobile; a strap pivotally connected to one end of said member; a clasp pivotally connected to the free end of said strap; means to lock said clasp on said base member; and a finger struck up from said clasp to engage a notch in said base member and frictionally retain said clasp and base member together, without the aid of said lock.

2. In combination with the spare tire carrier ring of an automobile; a base member supported entirely by said ring, and extending laterally therefrom; a strap swingably connected to one end of said base member, said strap being provided with a curved portion adapted to embrace an extra spare tire supported on said base member; a clasp pivotally mounted on said strap; and means on said clasp to engage in said base member for frictionally retaining said clasp and said base member together.

3. A spare tire carrier comprising a base member attachable to a tire carrier ring mounted on an automobile, said member being provided with a loop; a strap hingedly connected with one end to said base member; a clasp pivotally connected to the free end of said strap and provided with a slot to engage said loop; means mounted on said clasp to engage in a notch in said base member for frictionally holding said member and said clasp together; and means to lock said latch on the loop of said base member.

4. A spare tire carrier comprising a base member attachable to a tire carrier ring mounted on an automobile, said base member extending laterally from said ring to provide support for an additional tire; a strap hinged at one end to said base member, said strap being provided with a plurality of curved portions adapted to engage a plurality of spare tires; a clasp pivotally connected to the free end of said strap and provided with a slot to engage a loop on said base member; means mounted on said clasp to engage in a notch in said base member for frictionally holding said clasp and member together; and means to lock said latch on the loop of said base member.

In testimony whereof I have signed my name to this specification in the presence of two subscribing witnesses.

WILLIAM F. BEHLING.

Witnesses:
CONRAD BEHLING,
C. VAN HOUSEN.